Jan. 26, 1954     P. TRAUGOTT     2,667,402
MARKING DEVICE
Filed July 27, 1951

INVENTOR
PAUL TRAUGOTT
BY *Strauch, Nolan & Diggins*
ATTORNEYS

Patented Jan. 26, 1954

2,667,402

UNITED STATES PATENT OFFICE 2,667,402

MARKING DEVICE

Paul Traugott, Greenwich, Conn., assignor to Electro-Physical Laboratories, Inc., Rye, N. Y., a corporation of New York Application July 27, 1951, Serial No. 238,972

3 Claims. (Cl. 346—140)

This invention relates to a marking device of the type wherein a pen traces a line of ink across a relatively movable chart and is particularly adapted to a device of this type wherein the pen is heated and deposits normally solid ink upon the chart.

The invention will be described as applied to the moving stylus arm of a portable basal metabolism machine wherein it has already been reduced to practice but it will be understood that as a marking device it is capable of being employed in any apparatus where pen and chart relative movements are required and it is desired to deposit a trace of ink which is normally solid at room temperatures upon the chart or other record.

It is therefore a major object of my invention to provide a novel marking apparatus wherein a pen is heated and adapted to deposit a continuous liquid trace of ink which becomes solid under normal room temperatures upon a chart or the like.

A further object of the invention is to provide a marking arm containing a reservoir of ink which is solid at room temperatures and a heated pen for melting the ink when the pen is in use and for withdrawing the liquid melted ink from the reservoir and conveying it by capillary action to the point of deposit on a record.

It is a further object of my invention to provide a marking arm or stylus having a novel heated hollow pen.

It is a further object of my invention to provide a marking arm or stylus wherein a hollow pen of high resistance metal is provided to function both as a heater element for melting a normally solid body of ink and as a capillary tube for conducting melted liquid ink from a reservoir to the point of deposit on a chart or the like.

Further objects of the invention will presently appear as the description proceeds in connection with the appended claims and the annexed drawings wherein:

Figure 1:
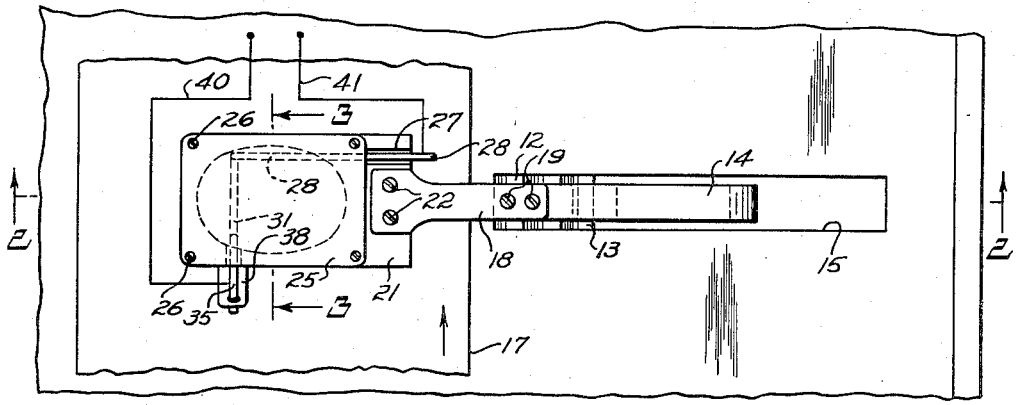
Figure 1 is a fragmentary top plan view of a portable basal metabolism apparatus in which the novel marking arm of the present invention is employed.
Figure 3:
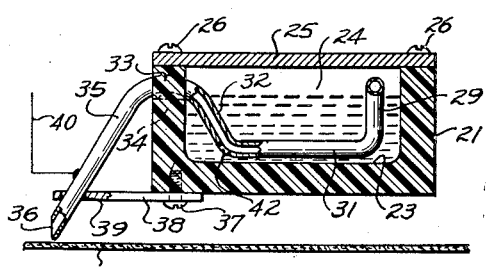
Figure 4:
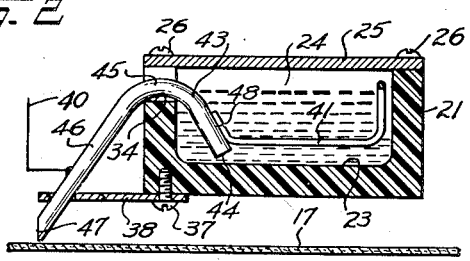

Figure 3 is an enlarged section substantially on line 3—3 of Figure 1 illustrating a preferred embodiment of the pen structure wherein the hollow high resistance metal pen tubing extends throughout the reservoir; and Figure 4 is an enlarged section illustrating a pen according to a further embodiment of the invention wherein the pen is shorter than in the other embodiment and has an open end disposed within the ink reservoir.

The portable basal metabolism apparatus comprises a casing 11 containing a bellows 12 having an end wall 13 that reciprocates back and forth in response to breathing of the patient. Attached to end wall 13 is a rigid bracket 14 which extends outwardly through a slot 15 in the wall of the casing 11 and has mounted thereupon the marking arm of the invention which will now be described in detail.

Bracket 14 comprises a substantially horizontal upper portion 16 above the top wall of the casing and that portion 16, during expansion and contraction of the bellows, reciprocates back and forth in a horizontal direction perpendicular to the direction of movement of a chart 17 which in the apparatus is continuously motor driven in a path parallel to the path of movement of bracket portion 16 but perpendicular thereto.

Bracket 14, including its arm 16, is preferably a rigid piece of metal attached to the bellows wall 13. Mounted upon end of bracket arm 16 near the chart 17 is a spring metal leaf 18 which is secured to bracket arm 16 as by screws 19 and projects therefrom over the chart 17. A block of electrical insulating material 21, which may be Bakelite or any other suitable hard plastic that is resistant to high temperature, is suspended above the chart 17, being attached securely to the other end of spring leaf 18, as by screws 22. Spring leaf 18 is rigid enough to support the weight of block 21 and the pen and the ink therein which will be presently described, substantially shown in Figure 2, but it is flexible enough so that it will permit the pen to merely ride on the paper thereby compensating for any slight irregularity in level between chart 17 and the pen during operation.

Block 21 contains a recess 23 which functions as a reservoir for a body of ink 24 which is of a suitable composition that will be solid at normal room temperatures but may be heated to a free flowing liquid state relatively quickly as will appear. A suitable cover plate 25, preferably of some electrical insulating material, is secured over the reservoir as by screws 26 and protects it against entry of dirt and undesired foreign material.

Figure 2:
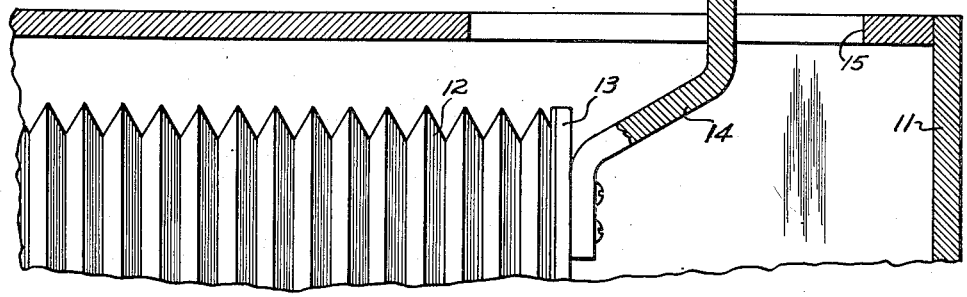
Figure 2 is a section substantially along line 2—2 of Figure 1 further illustrating the marking apparatus and particularly the reservoir therefor.

Adjacent but spaced from the attached end of leaf spring 18, block 21 is formed with an upper surface channel 27 through which extends a slender small diameter hollow tube 28 that passes under the cover plate 25 into the top of the reservoir as illustrated in Figure 2. Tube 28 is stiff enough to retain its bent shape. As further illustrated in Figures 2 and 3, tube 28 is bent at right angles within and near the opposite wall of the reservoir to provide a downwardly extending vertical portion 29 that is further bent just before it touches the bottom of the reservoir to extend at right angles laterally across the reservoir in a horizontal portion indicated at 31 in Figure 3. Just before it reaches the other side wall of the reservoir, the tube is further bent outwardly at an angle of about 45 degrees, providing an inclined portion 32 within the reservoir which before it reaches the cover plate 25 is formed with an arcuate portion 33 that passes through an aperture 34 in the side wall of block 21 and then extends downwardly at about 45 degrees outside block 21 to provide an inclined pen point portion 35 projecting toward the surface of chart 17.

As illustrated in Figure 3, the open end 36 of the hollow tube comprises a mouth cut at an angle to the axis of the tube and open for discharge of liquid upon the surface of the chart. The tip of the pen may rest lightly on the chart but preferably it is supported slightly above the chart surface in order to eliminate the effect of friction between the end of the pen and the paper. This elimination of friction is particularly important in medical apparatus like basal metabolism meters and the like where the forces which move the pen are very small and wherein elimination of these frictional factors may contribute greatly to the accuracy and intelligence of the results obtained by the apparatus.

Secured to the underside of block 21, as by screws 37, is a strip 38 of fiber board or other rigid electrical insulation material having an aperture 39 through which passes the descending end portion 35 of the pen. The function of this strip 38 which extends rigidly horizontal above the surface of the chart is to support the end of the pen in the assembly.

The tubing 28, over its entire length extending through the reservoir and down to the paper, is preferably a constant small diameter tube of metal having such high electrical resistance that when energized by passage of a normal 110-volt house current therethrough it will heat up sufficiently to quickly melt the body of solid ink 24 disposed in the reservoir recess 23. Suitable clips (not shown) are employed for rigidly anchoring tube 28 to block 21 within the reservoir where it is out of electrical contact with any grounded portion of the apparatus. As illustrated in Figure 1, wires 40 and 41 are connected across the ends of the tube whereby when this line is energized the tube is heated by passage of current therethrough.

As shown in Figure 3, the tube is open to the reservoir by means of a small aperture 42 formed in the wall thereof at the junction of tube portions 31 and 32 and adjacent the bottom of the reservoir. The tube is of such interior diameter that portions 32, 33 and 35 will function as a continuous capillary tube for conveying melted liquid ink from the reservoir to the surface of the chart 17 during operation.

In practice I found it advisable to use a high resistance metal tube having about .012 inch internal diameter with a hole 42 of about .022 inch in area. The diameter of the tube in practice is selected as a function of the viscosity of the melted liquid ink and in operation the combined effects of surface tension and viscosity of the liquid ink must be such that the liquid will enter at 42 and flow upward by capillary action and then to the end of the tube at the paper surface. Thus the tube dimensions may be varied to suit the ink being conveyed thereby.

In operation, when the metabolism test is to be made, the operator may before starting the test simply turn a switch energizing the high resistance tube 28, which heats up and immediately renders the ink within the reservoir 24 liquid and flowable. A very considerable advantage of this arrangement is that any ink which may be lodged solid within the tube is also at the same time rendered liquid and flowable and there is no accumulation of dried ink on the pen such as may be found in the usual prior device of this type where highly volatile inks are employed and which dry in crusts upon and in the pen.

Any suitable thermally responsive ink may be employed. One which I have found highly advantageous is one wherein the normal solidity at room temperature is incorporated mainly by stearic acid or other wax-like material which may be dyed or colored suitably. Ink containing a stearic acid base becomes quickly liquid upon the rise in temperature of only about 50° F. above 70° F.

Figure 4 shows a further embodiment of the invention wherein the length of the tubing for the pen is shorter than in the previous embodiment. This pen comprising a upwardly inclined length 43, open end portion 44 being disposed near the bottom of the reservoir, an arcuate portion 45 curved over the edge of the side wall recess 34, and a downwardly inclined pen point portion 46 terminating in an open mouth 47 disposed just above the surface of chart 17.

This pen is like the outer end of the pen described in Figures 1–3, the only difference being that the length of tubing within the reservoir has been considerably shortened and this may be done where saving in the tubing material is desired. The wire 41 in this case extends through an aperture in the side of the Bakelite block 21 above the ink body and is attached as by soldering at 48 to the tube within the reservoir. When the additional length of heating tube is not needed, the length 43 within the reservoir is adequate to turn the ink from solid to liquid state. The melted liquid ink enters the tube end 44 and travels along the tube by capillary action as in the earlier embodiment.

I have therefore provided a marking arm whereby ink which is normally solid at room temperatures may be rendered quickly liquid and drawn from the reservoir for deposit in a fine line upon a chart and which dries very quickly on the chart, assuming its normally solid state. The tube is a slender hollow tube of high resistance metal such as stainless steel heated by the passage of current therethrough so that it functions both as a heater element for the solid body of ink and as a conveyor for transferring ink from the reservoir to the surface of the paper.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a marking device, a support having a reservoir for containing a body of ink that is substantially non-liquid and non-free-flowing at normal room temperatures, a pen comprising a small diameter unobstructed hollow metal tube mounted on said support and having part of its length and an open portion disposed within the reservoir below the ink level and a pen point portion projecting from said reservoir, at least the length of said tube within said reservoir being of high electrical resistance metal so as to become heated by passage of electric current therethrough to render said ink body liquid, and means for connecting said high resistance length of tube into an energizing electrical circuit, said tube being of such dimensions that the liquefied ink will flow freely therethrough toward the pen point by capillary action.

2. In a marking device, a marker arm having a recess defining a reservoir for a body of ink which is normally substantially solid at room temperatures, a pen comprising an unobstructed hollow tube of capillary internal dimensions mounted on said arm and having an open portion and part of its length disposed within said reservoir submerged within the body of ink and a pen point portion projecting from said reservoir and adapted to be disposed adjacent the surface of a chart to be marked, said tube being made chiefly of a high resistance metal which becomes heated upon the passage of electrical current therethrough so that said tube serves both as a heater element for melting the body of ink to liquid state and a conduit to deposit the liquid ink on the chart, and electrical connections for heating said tube.

3. In a marking apparatus, a movable rigid arm, a block of solid electrically insulating material having a recess defining a reservoir for a body of normally solid ink, a spring beam mounting said block on said arm, and a hollow pen tube of electrically high resistance metal having an interior diameter of capillary dimensions having an open end portion disposed within said reservoir near the bottom thereof and a pen point portion projecting outwardly of said reservoir, and means for connecting said tube into an energizing circuit for electrically heating said tube to melt said ink body.

PAUL TRAUGOTT.

References Cited in the file of this patent

UNITED STATES PATENTS

| Number | Name | Date |
|---|---|---|
| 1,550,048 | Ruben | Aug. 18, 1925 |
| 1,656,338 | Ranger | Jan. 17, 1928 |
| 1,938,861 | Roe | Dec. 12, 1933 |
| 2,577,721 | Belak | Dec. 4, 1951 |